(12) United States Patent
Lee et al.

(10) Patent No.: US 12,283,713 B2
(45) Date of Patent: Apr. 22, 2025

(54) BATTERY PACK COMPRISING FIRE EXTINGUISHING UNIT

(71) Applicant: LG ENERGY SOLUTION, LTD., Seoul (KR)

(72) Inventors: Jin-Kyu Lee, Daejeon (KR); Goan-Su Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 541 days.

(21) Appl. No.: 17/640,741

(22) PCT Filed: Aug. 19, 2020

(86) PCT No.: PCT/KR2020/011047
§ 371 (c)(1),
(2) Date: Mar. 4, 2022

(87) PCT Pub. No.: WO2021/045410
PCT Pub. Date: Mar. 11, 2021

(65) Prior Publication Data
US 2022/0359947 A1   Nov. 10, 2022

(30) Foreign Application Priority Data
Sep. 5, 2019 (KR) ........................ 10-2019-0110333

(51) Int. Cl.
*H01M 50/383* (2021.01)
*A62C 3/16* (2006.01)
(Continued)

(52) U.S. Cl.
CPC ............. *H01M 50/383* (2021.01); *A62C 3/16* (2013.01); *A62C 37/00* (2013.01);
(Continued)

(58) Field of Classification Search
CPC .................................................. H01M 50/383
See application file for complete search history.

(56) References Cited

U.S. PATENT DOCUMENTS 9,246,197 B2 * 1/2016 Yoon .................... H01M 10/617
9,379,419 B2   6/2016 Krolak
(Continued)

FOREIGN PATENT DOCUMENTS

CN   103003606 A * 3/2013 ......... F02M 21/0239
CN   205759227 U   12/2016
(Continued)

OTHER PUBLICATIONS

Machine translation of CN 207353336 (no date) (Year: 0000).*
(Continued)

*Primary Examiner* — Amanda C. Walke
(74) *Attorney, Agent, or Firm* — Birch, Stewart, Kolasch & Birch, LLP

(57) ABSTRACT

A battery pack includes at least two battery modules arranged in one direction; and a fire extinguisher having a fire extinguishing tank configured to contain a fire extinguishing agent therein, a pipe connected to the fire extinguishing tank to supply the fire extinguishing agent from the fire extinguishing tank to each of the at least two battery modules, a flow rate adjuster provided to the pipe and configured to adjust a feed flow rate of the fire extinguishing agent to be constant, and at least one valve configured to supply the fire extinguishing agent from the fire extinguishing tank to the battery module having an internal temperature rising over a predetermined temperature.

14 Claims, 9 Drawing Sheets

(51) Int. Cl.
  *A62C 37/00*  (2006.01)
  *H01M 50/204*  (2021.01)
  *A62C 37/40*  (2006.01)

(52) U.S. Cl.
  CPC .......... *H01M 50/204* (2021.01); *A62C 37/40* (2013.01); *H01M 2200/10* (2013.01)

(56) References Cited

U.S. PATENT DOCUMENTS

| | | | |
|---|---|---|---|
| 12,034,177 B2 * | 7/2024 | Lee | ................ H01M 10/6561 |
| 2007/0164711 A1 | 7/2007 | Kim et al. | |
| 2011/0189511 A1 | 8/2011 | Yoon | |
| 2017/0301967 A1 | 10/2017 | Kim | |
| 2020/0313245 A1 | 10/2020 | Feng et al. | |

FOREIGN PATENT DOCUMENTS

| | | | | |
|---|---|---|---|---|
| CN | 207353336 U | * | 5/2018 | |
| CN | 207368148 U | | 5/2018 | |
| CN | 207591147 U | | 7/2018 | |
| CN | 109499027 A | * | 3/2019 | ............... A62C 3/07 |
| CN | 109513135 A | | 3/2019 | |
| CN | 109686888 A | | 4/2019 | |
| CN | 109985335 A | | 7/2019 | |
| CN | 110120477 A | | 8/2019 | |
| CN | 209286539 U | * | 8/2019 | ............... A62C 3/16 |
| CN | 110404208 A | * | 11/2019 | ............... A62C 3/16 |
| CN | 113117274 A | * | 7/2021 | |
| CN | 113285128 A | * | 8/2021 | ............... A62C 3/07 |
| EP | 4 002 543 A1 | | 5/2022 | |
| JP | 2008-264039 A | | 11/2008 | |
| JP | 2009048588 A | * | 3/2009 | |
| JP | 2011-254906 A | | 12/2011 | |
| JP | 2014-61218 A | | 4/2014 | |
| JP | 2018-55768 A | | 4/2018 | |
| JP | 2019-54973 A | | 4/2019 | |
| JP | 2019-75191 A | | 5/2019 | |
| JP | 2019-126206 A | | 7/2019 | |
| JP | 2006-125558 A | | 3/2025 | |
| KR | 10-2007-0073173 A | | 7/2007 | |
| KR | 10-2011-0090236 A | | 8/2011 | |
| KR | 10-2016-0047345 A | | 5/2016 | |
| KR | 10-1706717 B1 | | 3/2017 | |
| KR | 10-2018-0092521 A | | 8/2018 | |
| KR | 10-1918022 B1 | | 11/2018 | |
| KR | 10-1998279 B1 | | 7/2019 | |
| KR | 102050803 B1 | * | 11/2019 | |
| KR | 20210047214 A | * | 4/2021 | |
| WO | WO 2012/015004 A1 | | 2/2012 | |
| WO | WO 2019/119997 A1 | | 6/2019 | |

OTHER PUBLICATIONS

International Search Report for PCT/KR2020/011047 (PCT/ISA/210) mailed on Dec. 2, 2020.

English Machine Translation of JP 2018-55768 A, dated Apr. 5, 2018.

Extended European Search Report for European Application No. 20860477.7, dated Nov. 24, 2022.

* cited by examiner

BATTERY PACK COMPRISING FIRE EXTINGUISHING UNIT

TECHNICAL FIELD

The present disclosure relates to a battery pack including a fire extinguishing unit, and more particularly, to a battery pack having a reduced risk of secondary ignition or explosion.

The present application claims priority to Korean Patent Application No. 10-2019-0110333 filed on Sep. 5, 2019 in the Republic of Korea, the disclosures of which are incorporated herein by reference.

BACKGROUND ART

Secondary batteries commercialized at the present include nickel cadmium batteries, nickel hydrogen batteries, nickel zinc batteries, and lithium secondary batteries. Among them, lithium secondary batteries are in the spotlight due to free advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, namely a battery pouch exterior, for hermetically storing the electrode assembly together with an electrolyte.

Recently, secondary batteries are widely used not only in small devices such as portable electronic devices, but also in middle-sized or large-sized devices such as vehicles and energy storage systems. When used in the middle-sized or large-sized device, a large number of secondary batteries are electrically connected to increase capacity and output. In particular, pouch-type secondary batteries are widely used in the middle-sized or large-sized devices since they may be easily stacked.

Meanwhile, recently, as the need for a large-capacity structure increases along with the use as an energy storage source, the demand for a battery pack including a plurality of secondary batteries electrically connected in series and/or in parallel, and a battery module accommodating the secondary batteries therein, and a battery management system (BMS) is increasing.

In addition, the battery pack generally includes an outer housing made of a metal material to protect or store the plurality of secondary batteries from an external shock. Meanwhile, the demand for high-capacity battery packs is increasing recently.

However, since the conventional battery pack or the conventional battery rack has a plurality of battery modules, if the secondary batteries of each battery module generates thermal runaway to cause ignition or explosion, heat or flame may be transferred to neighboring secondary batteries to cause secondary explosions, so efforts to prevent secondary ignition or explosion are increasing.

Accordingly, there is a need for a fast and complete fire extinguishing technology to take immediate action when thermal runaway occurs in some secondary batteries in the battery pack or the battery rack.

In addition, when the conventional battery pack or battery rack includes a plurality of battery modules, the variation in fire extinguishing capability is likely to occur depending on the physical distance from a fire extinguishing device. That is, a battery module close to the fire extinguishing device may have a higher flow rate at which a fire extinguishing agent is injected, compared to a battery module located relatively far away.

Accordingly, a battery module relatively far from the fire extinguishing device does not exhibit sufficient fire extinguishing capability, which may cause problems such as difficult fire extinguishing or lowered extinguishing speed when a fire occurs.

DISCLOSURE

Technical Problem

The present disclosure is designed to solve the problems of the related art, and therefore the present disclosure is directed to providing a battery pack, which reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof

Technical Solution

In one aspect of the present disclosure, there is provided a battery pack, comprising:

at least two battery modules arranged in one direction; and a fire extinguisher having a fire extinguishing tank configured to contain a fire extinguishing agent therein, a pipe connected to the fire extinguishing tank to supply the fire extinguishing agent from the fire extinguishing tank to each of the at least two battery modules, a flow rate adjuster provided to the pipe and configured to adjust a feed flow rate of the fire extinguishing agent to be constant, and at least one valve configured to supply the fire extinguishing agent from the fire extinguishing tank to a battery module of the at least two battery modules having an internal temperature rising over a predetermined temperature.

Also, the pipe may include a common pipe connected to an outlet hole of the fire extinguishing tank through which the fire extinguishing agent is output, and at least two distribution pipes diverging from the common pipe, and the flow rate adjuster may be provided at the common pipe.

Moreover, the flow rate adjuster may include at least one decompression valve configured to reduce a feed pressure of the fire extinguishing agent to a predetermined pressure or below.

In addition, a passive valve may be provided at a distal end of the distribution pipe in a direction along which the fire extinguishing agent moves, so that the passive valve is opened to inject the fire extinguishing agent into the battery module when the battery module is heated over the predetermined temperature.

Further, each of the at least two battery modules may have a gas passage through which gas generated in the battery module moves, and an inlet hole connected to the gas passage so that the inside of the battery module communicates with the outside.

Also, at least a part of the passive valve may be inserted into the battery module through the inlet hole.

In addition, the at least two distribution pipes may be configured to have different pipe diameters.

Further, among the at least two distribution pipes, a distribution pipe diverging at a location relatively closer to the outlet hole may have a smaller pipe diameter compared to the remaining distribution pipe.

Also, in another aspect of the present disclosure, there is also provided a battery rack, comprising: a battery pack; and a rack case configured to accommodate the battery pack.

Moreover, in another aspect of the present disclosure, there is also provided an energy storage system, comprising two or more battery racks.

In addition, the pipe provided to the fire extinguisher of the battery rack may include a common pipe connected to an outlet hole of the fire extinguishing tank through which the fire extinguishing agent is output, and at least two parallel pipes diverging from the common pipe to each of the two or more battery racks.

Further, the flow rate adjuster may be provided to at least a part of the at least two parallel pipes.

Advantageous Effects

According to an embodiment of the present disclosure, since the fire extinguishing unit is provided to the pipe and includes the flow rate adjusting part configured to adjust the feed flow rate of the fire extinguishing agent to be constant, the period (time) during which the fire extinguishing agent is supplied at a constant flow rate without a rapid rise or drop of the feed flow rate may be lengthened. Accordingly, it is possible to solve the problem of the conventional battery pack that a deviation in fire extinguishing capability occurs between battery modules according to a pipe distance by which the fire extinguishing agent of the fire extinguishing device is supplied.

Also, according to an embodiment of the present disclosure, since the flow rate adjusting part includes at least one decompression valve configured to reduce the feed pressure of the fire extinguishing agent to a predetermined pressure or below, the period during which the fire extinguishing agent is supplied at a constant flow rate without a rapid rise or drop of the feed flow rate may be lengthened. Accordingly, it is possible to effectively solve the conventional problem that a deviation in fire extinguishing capability deviation occurs between battery modules due to the fire extinguishing device and the pipe distance as a deviation in feed pressure occurs over time.

Moreover, according to an embodiment of the present disclosure, since at least a part of the passive valve is inserted into the inlet hole perforated to communicate with the gas discharge passage provided to the battery module, when thermal runaway occurs, the passive valve opens so that the fire extinguishing agent may be injected individually only to the million battery module at which the thermal runaway occurs. Moreover, since the fire extinguishing agent may be injected directly into the battery module, rather than to an outside thereof, it is possible to effectively extinguish and cool the fire of the battery module at which thermal runaway occurs.

Further, according to an embodiment of the present disclosure, since the at least two distribution pipes are configured to have different pipe diameters, the feed flow rate of the fire extinguishing agent supplied through the distribution pipe may less deviate. Thus, it is possible to solve the conventional problem that the fire extinguishing capability deviates among the battery modules according to the pipe distance of the fire extinguishing device in the battery pack. Therefore, it is possible to secure stable fire extinguishing capability of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
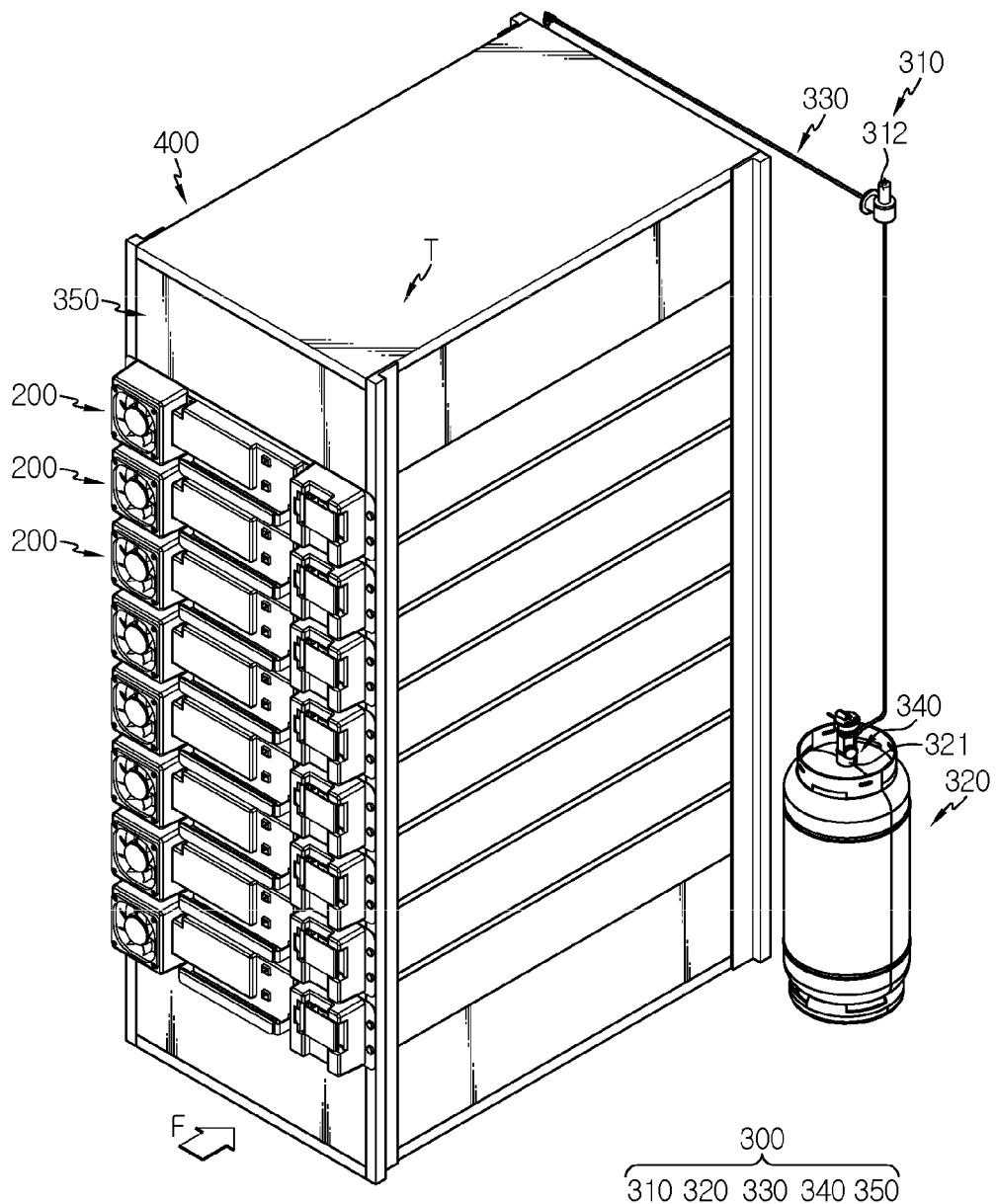
FIG. 1 is a front perspective view schematically showing a battery pack according to an embodiment of the present disclosure.
Figure 2:
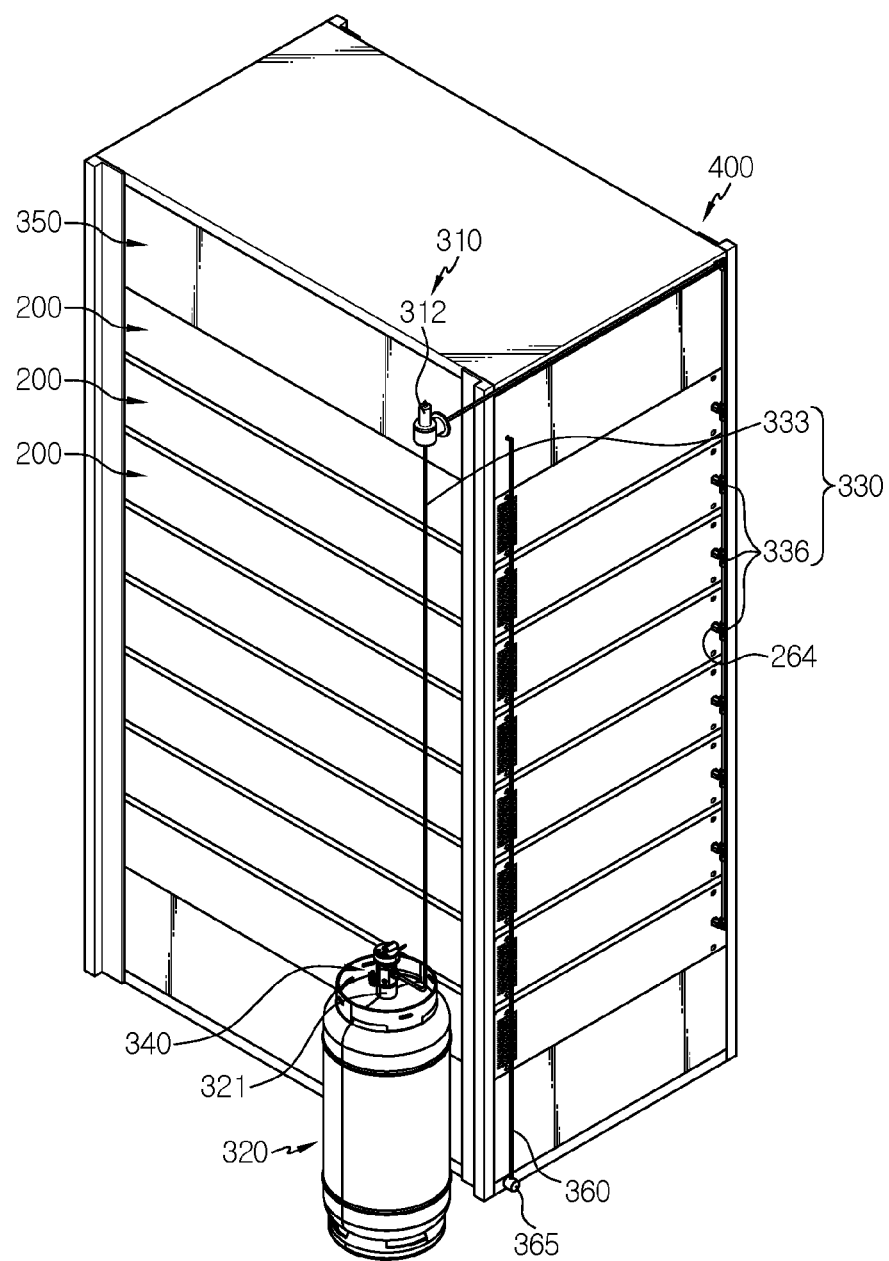
FIG. 2 is a rear perspective view schematically showing the battery pack according to an embodiment of the present disclosure.

FIG. 1 is a front perspective view schematically showing a battery pack according to an embodiment of the present disclosure. FIG. 2 is a rear perspective view schematically showing the battery pack according to an embodiment of the present disclosure. Also, FIG. 3 is a diagram schematically showing components of the battery pack according to an embodiment of the present disclosure.

Figure 3:
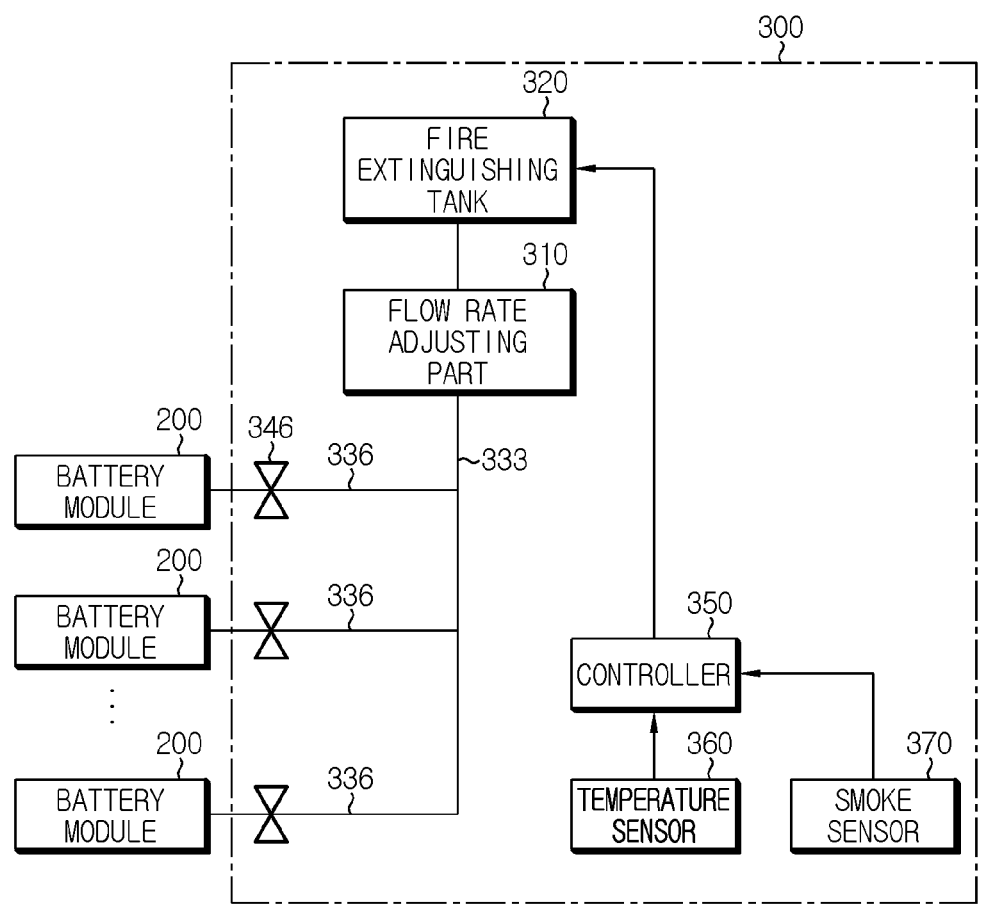
FIG. 3 is a diagram schematically showing components of the battery pack according to an embodiment of the present disclosure.

Referring to FIGS. 1 to 3, a battery pack 400 according to an embodiment of the present disclosure includes at least two battery modules 200 arranged in one direction, and a fire extinguishing unit 300 configured to extinguish a fire of the battery module 200.

Specifically, the fire extinguishing unit 300 may include a flow rate adjusting part 310, a fire extinguishing tank 320, a pipe 330, and a valve 340.

First, the fire extinguishing tank 320 may contain a fire extinguishing agent (not shown) therein. For example, the fire extinguishing agent may be any one selected from a concentrated solution of an inorganic salt such as potassium carbonate, a chemical bubble, an air bubble, carbon dioxide, and water. In addition, the fire extinguishing tank 320 may have a compressed gas therein to inject or move the fire extinguishing agent at an appropriate pressure along the pipe 330. For example, if water is included as the fire extinguishing agent, the fire extinguishing agent may further include an additive configured to increase the cooling capacity of the water. For example, the additive may be a thickener or a penetrant. For example, the penetrant may be a surfactant. The penetrant may increase the penetration effect of water by lowering the surface tension of water.

For example, the capacity of the fire extinguishing tank 320 may be 59 L, the compressed gas may be nitrogen of 8 bar, and the fire extinguishing agent may be 40 L of water. Here, if the fire extinguishing agent is water, when the fire extinguishing agent is sprayed into the battery module 200, the fire extinguishing agent has a heat shielding effect together with the fire extinguishing and cooling effect, so it is effective in preventing thermal propagation when high-temperature gas and flame are generated due to thermal runaway. As a result, it is possible to effectively prevent a fire or thermal runaway from propagating among the plurality of battery modules 200.

Moreover, the fire extinguishing tank 320 may be located at one horizontal side of the battery pack 400. Alternatively, although not separately shown in the drawings, the fire extinguishing tank 320 may be mounted to an upper portion T of the battery pack 400. If the fire extinguishing tank 320 is mounted to the upper portion of the battery pack 400, the fire extinguishing tank 320 may contain the fire extinguishing agent without any additional compressed gas. That is, the fire extinguishing agent contained in the fire extinguishing tank 320 may be discharged from the fire extinguishing tank 320 by gravity and supplied to each of the plurality of battery modules 200 included in the battery pack 400.

The pipe 330 may be configured to be connected to supply the fire extinguishing agent from the fire extinguishing tank 320 to each of the at least two battery modules 200. For example, the pipe 330 may be made of a material that is not corroded by water. For example, the pipe 330 may be made of stainless steel. One end of the pipe 330 may be connected to an outlet hole 321 of the fire extinguishing tank 320. The other end of the pipe 330 may have a shape extending to the inside of each of the at least two battery modules 200.

For example, the pipe 330 may include a common pipe 333 connected to the outlet hole 321 of the fire extinguishing tank 320 through which the fire extinguishing agent is discharged, a distribution pipe 336 having a distributed structure to be connected to an inlet hole 264 provided in each of the at least two battery modules 200 from the common pipe 333. For example, as shown in FIG. 2, the pipe 330 may include one common pipe 333 connected to the outlet hole 321 of the fire extinguishing tank 320, and eight distribution pipes 336 branched from the common pipe 333. In addition, the eight distribution pipes 336 may be configured to be connected to the inlet holes 264 of eight battery modules 200.

In addition, the flow rate adjusting part 310 may be provided at a position of the pipe 330. The flow rate adjusting part 310 may be configured so that a feed flow rate of the fire extinguishing agent becomes constant. For example, the flow rate adjusting part 310 may decompression a feed pressure of the fire extinguishing agent so that the flow rate of the fire extinguishing agent discharged from the fire extinguishing tank 320 and supplied to each of the at least two battery modules 200 is constant.

Moreover, the valve 340 may be configured to supply the fire extinguishing agent from the fire extinguishing tank 320 to the battery module 200 having an internal temperature rising over a predetermined temperature. When the internal temperature of the battery module 200 rises over the predetermined temperature, a controller 350 may sense the internal temperature, and the valve 340 may be actively opened by the controller 350. In this case, the controller 350 may be located on a battery module located at an uppermost side among the plurality of battery modules 200. Here, the predetermined temperature may be 100° C. or above.

Therefore, according to this configuration of the present disclosure, since the fire extinguishing unit 300 is provided to the pipe 330 and includes the flow rate adjusting part 310 configured to adjust the feed flow rate of the fire extinguishing agent to be constant, the period (time) during which the fire extinguishing agent is supplied at a constant flow rate without a rapid rise or drop of the feed flow rate may be lengthened. Accordingly, it is possible to solve the problem of the conventional battery pack 400 that a deviation in fire extinguishing capability occurs between battery modules 200 according to a pipe distance by which the fire extinguishing agent of the fire extinguishing device is supplied.

The fire extinguishing unit 300 may include a controller 350. Specifically, the controller 350 may be configured to open the valve 340 when the temperature sensor 360 senses a temperature over the predetermined temperature. For example, when the valve 340 is an active valve, the controller 350 may be configured to transmit a signal for controlling the active valve. For example, the temperature sensor 360 may be a linear temperature sensor.

For example, the linear temperature sensor 360 may be configured to melt when a heat sensing material coated on two wires reaches a temperature higher over a reference temperature, to cause a short circuit between the two wires, thereby emitting a fire or overheat signal. For example, the heat sensing material may be a thermoplastic resin that melts at 70° C. to 100° C. For example, the thermoplastic resin may be a polyester resin or an acrylic resin. Additionally, the linear temperature sensor 360 may further include an insulating coating material configured to surround the heat sensing material. The coating material may include polyvinyl chloride.

In addition, the linear temperature sensor 360 may have a structure extending linearly along at least two battery modules 200 arranged in one direction. For example, as shown in FIG. 2, the battery pack 400 may include eight battery modules 200 arranged in a vertical direction. The linear temperature sensor 360 may be configured so that one end thereof is connected to the controller 350 and extends along the eight battery modules 200 arranged in the vertical direction, and the other end thereof is connected to a resistor 365 at a distal end. At this time, a bracket (not shown) and a fixing buckle (not shown) may be used to partially fix the position of the linear temperature sensor 360.

Therefore, according to this configuration of the present disclosure, since the battery pack 400 includes the temperature sensor 360 linearly extending along at least two battery modules 200, it is possible to reduce the manufacturing cost of the battery pack.

That is, when a plurality of temperature sensors is applied in the prior art, a plurality of temperature sensors and separate signal wires for connecting the plurality of temperature sensors are required, which increases the manufacturing cost due to high material cost and long installation work. Meanwhile, the battery pack 400 of the present disclosure uses only one linear temperature sensor 360 to detect the temperature of the plurality of battery modules 200, so a separate signal wire is not required and easy installation is secured due to a light and flexible design. Thus, the manufacturing cost of battery pack 400 may be greatly reduced.

Moreover, the linear temperature sensor 360 is useful for setting a plurality of points for more accurate temperature sensing even for one battery module 200. Accordingly, in the present disclosure, it is possible to greatly reduce the failure rate in detecting the occurrence of fire in the battery module 200.

The fire extinguishing unit 300 may further include a smoke sensor 370 configured to sense a smoke discharged from the at least two battery modules 200. Specifically, the smoke sensor 370 may be located at an uppermost portion of the at least two battery modules 200 stacked in the vertical direction. That is, if a fire occurs in the battery module 200, the generated gas may be moved upward, so it is preferable that the smoke sensor 370 is located at the uppermost portion of the at least two battery modules 200.

In addition, the smoke sensor 370 may be configured to transmit a signal to the controller 350 of the fire extinguishing unit 300 when detecting smoke. The controller 350 may open the valve 340 according to the received signal.

Figure 4:
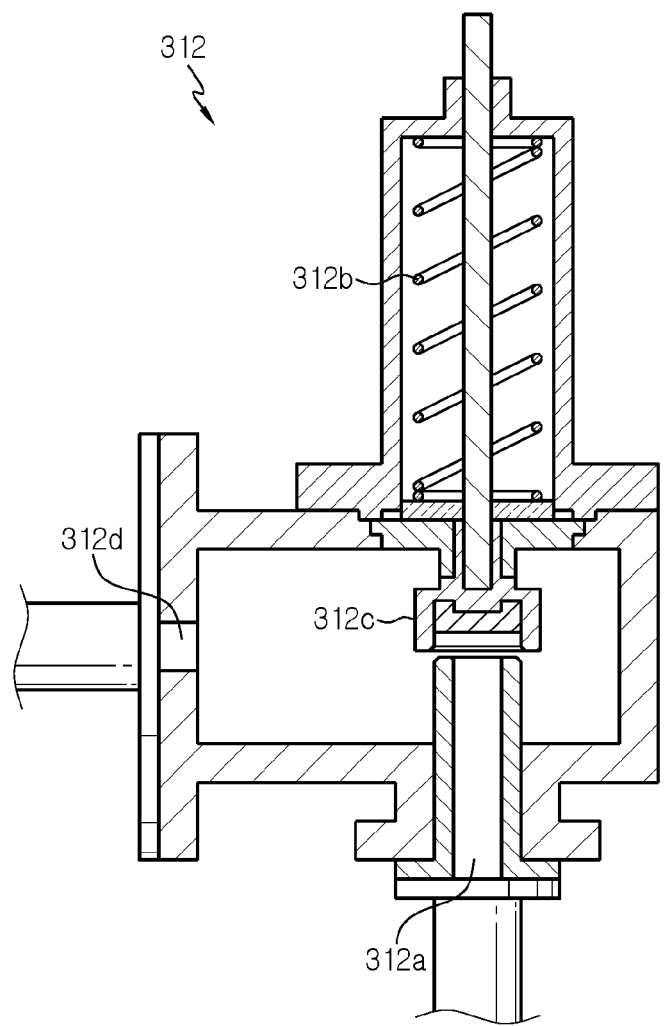
FIG. 4 is a sectional view schematically showing a section of a decompression valve, employed at the battery pack according to an embodiment of the present disclosure.

FIG. 4 is a sectional view schematically showing a section of a decompression valve, employed at the battery pack according to an embodiment of the present disclosure.

Referring to FIG. 4 along with FIG. 3, the flow rate adjusting part 310 may be provided to the common pipe 333. For example, the flow rate adjusting part 310 may include at least one decompression valve 312 having an inlet and an outlet respectively connected to the common pipe 333. The decompression valve 312 may be configured such that the feed pressure of the fire extinguishing agent is reduced to a predetermined pressure or below.

For example, as shown in FIG. 4, the decompression valve 312 may include a spring 312b configured to absorb the feed pressure of the fire extinguishing agent introduced into an inlet 312a from the valve 340. A disc 312c connected to one end of the spring 312b may be configured to open the inlet 312a of the decompression valve 312 over a predetermined feed pressure. At this time, the fire extinguishing agent introduced by opening the disc 312c may move to an outlet 312d along a pipe inside the valve body.

In another embodiment, without being limited to the decompression valve 312, the flow rate adjusting part 310 may include at least one flow rate control valve (not shown) configured to adjust the feed flow rate of the fire extinguishing agent to a predetermined amount. However, as the flow rate control valve, a general valve known in the art is used. Thus, the flow rate control valve will not be described in detail here. In addition, any kinds of valve or device capable of making the feed flow rate of the fire extinguishing agent constant may be applied.

Therefore, according to this configuration of the present disclosure, since the flow rate adjusting part 310 includes at least one decompression valve 312 configured to reduce the feed pressure of the fire extinguishing agent to a predetermined pressure or below, the period (time) during which the fire extinguishing agent is supplied at a constant flow rate without a rapid rise or drop of the feed flow rate may be lengthened. Accordingly, it is possible to effectively solve the conventional problem that a deviation in fire extinguishing capability deviation occurs between battery modules 200 due to the fire extinguishing device and the pipe distance as a deviation in feed pressure occurs over time.

Figure 5:
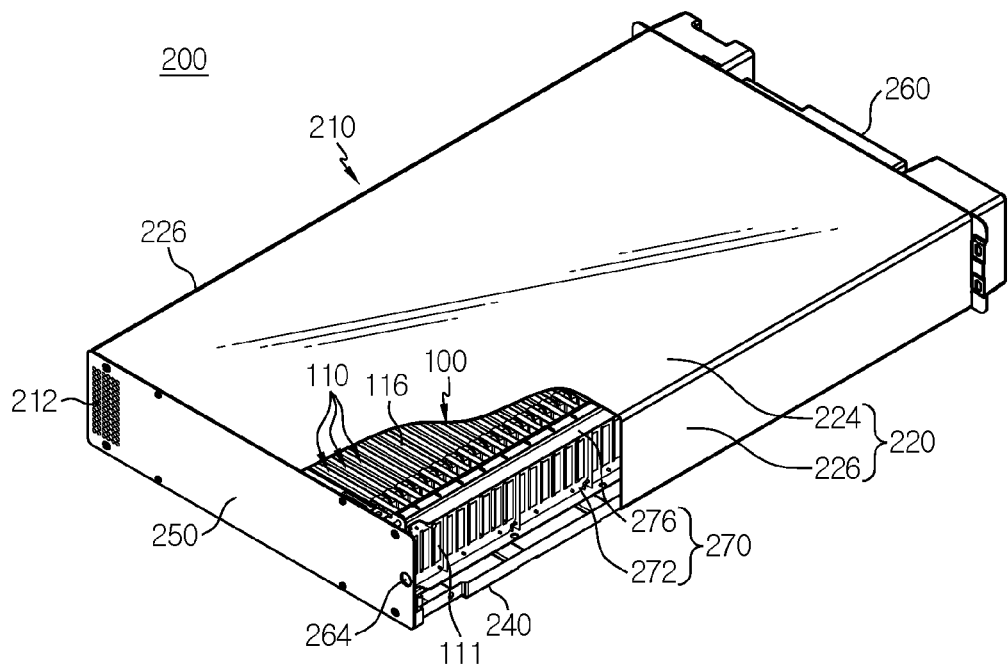
FIG. 5 is a rear perspective view schematically showing an inner configuration of a battery module, employed at the battery pack according to an embodiment of the present disclosure.
Figure 6:
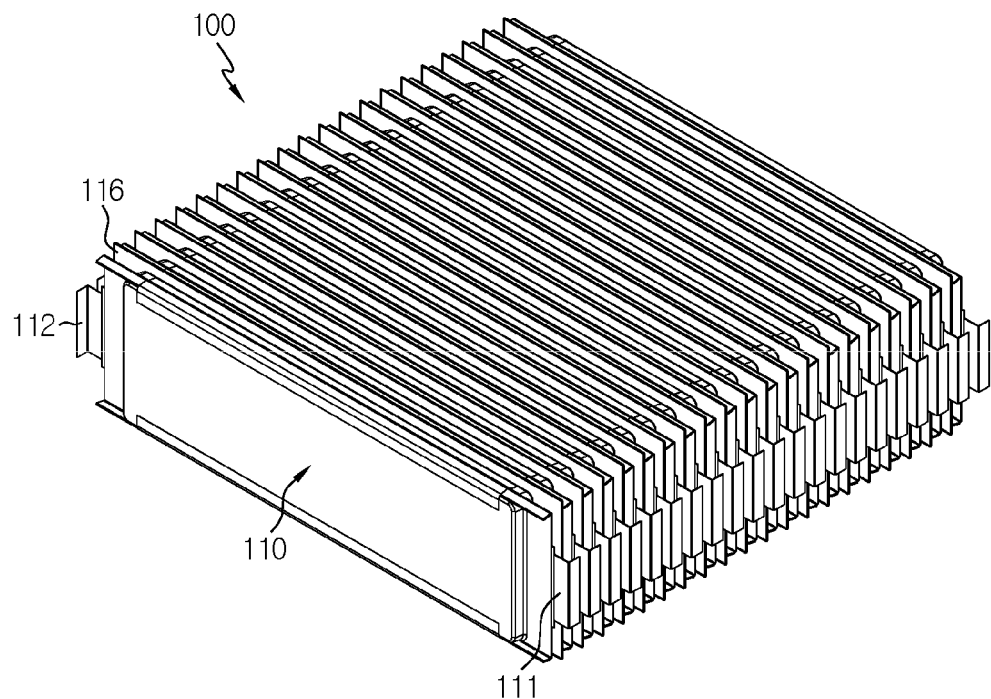
FIG. 6 is a perspective view schematically showing a cell assembly, employed at the battery pack according to an embodiment of the present disclosure.

FIG. 5 is a rear perspective view schematically showing an inner configuration of a battery module, employed at the battery pack according to an embodiment of the present disclosure. Also, FIG. 6 is a perspective view schematically showing a cell assembly, employed at the battery pack according to an embodiment of the present disclosure. Here, in FIG. 5, a portion is sectioned to illustrate the inner configuration of the battery module.

Referring to FIGS. 5 and 6, the battery module 200 according to an embodiment of the present disclosure may include at least two cell assemblies 100 and a module housing 210.

Each of the at least two cell assemblies 100 may include a plurality of secondary batteries 110 stacked in a front and rear direction. The secondary battery 110 may be a pouch-type secondary battery 110. For example, as shown in FIG. 5, when viewed in the F direction (from the front), each of the two cell assemblies 100 may be configured such that a plurality of pouch-type secondary batteries 110 are stacked side by side in the front and rear direction.

Meanwhile, in this specification, unless otherwise specified, the upper, lower, front, rear, left and right directions will be set based on when viewed in the F direction.

In particular, the pouch-type secondary battery 110 may include an electrode assembly (not shown), an electrolyte solution (not shown), and a pouch 116.

Moreover, a positive electrode lead 111 and a negative electrode lead 112 may be formed at left and right ends of the secondary battery 110, which are opposite to each other based on the center of the secondary battery 110. That is, the positive electrode lead 111 may be provided at one end (a right end) of the secondary battery 110 based on the center thereof. In addition, the negative electrode lead 112 may be provided at the other end (a left end) of the secondary battery 110 based on the center thereof.

However, the battery module 200 according to the present disclosure is not limited to the pouch-type secondary battery 110 described above, and various kinds of secondary batteries 110 known at the time of filing of this application may be employed.

Meanwhile, referring to FIG. 5 again, the battery module 200 may further include a bus bar assembly 270. Specifically, the bus bar assembly 270 may include at least one bus bar 272 configured to electrically connect the plurality of secondary batteries 110 to each other and at least two bus bar frame 276 configured to mount the at least at least one bus bar 272 at an outer side. The at least two bus bar frame 276 may be provided at left and right sides of the cell assembly 100, respectively.

Meanwhile, the module housing 210 may have an inner space to accommodate the cell assembly 100 therein. Specifically, when viewed directly in the F direction of FIG. 1, the module housing 210 may include an upper cover 220, a base plate 240, a front cover 260, and a rear cover 250.

Specifically, the base plate 240 may have an area larger than the size of a bottom surface of the at least two cell assemblies 100 so as to mount the at least two cell assemblies 100 to an upper portion thereof. The base plate 240 may have a plate shape extending in a horizontal direction.

In addition, the upper cover 220 may include an upper wall 224 and a sidewall 226 extending downward from the upper wall 224. The upper wall 224 may have a plate shape extending in a horizontal direction to cover an upper portion of the cell assembly 100. The sidewall 226 may have a plate shape extending downward from both left and right ends of the upper wall 224 to cover both left and right sides of the cell assembly 100.

In addition, the sidewall 226 may be coupled to a portion of the base plate 240. For example, as shown in FIG. 5, the upper cover 220 may include an upper wall 224 having a plate shape extending in the front, rear, left and right directions. The upper cover 220 may include two sidewalls 226 extending downward from both left and right ends of the upper wall 224, respectively. Further, lower ends of the two sidewalls 226 may be configured to be coupled with both left and right ends of the base plate 240, respectively. In this case, the coupling method may be a male and female coupling method or a welding method.

Moreover, the front cover 260 may be configured to cover the front side of the plurality of secondary batteries 110. For example, the front cover 260 may have a plate shape larger than the size of the front surface of the plurality of secondary batteries 110. The plate shape may be erected in a vertical direction.

In addition, the rear cover 250 may be configured to cover the rear side of the cell assembly 100. For example, the rear cover 250 may have a plate shape larger than the size of the rear surface of the plurality of secondary batteries 110.

Figure 7:
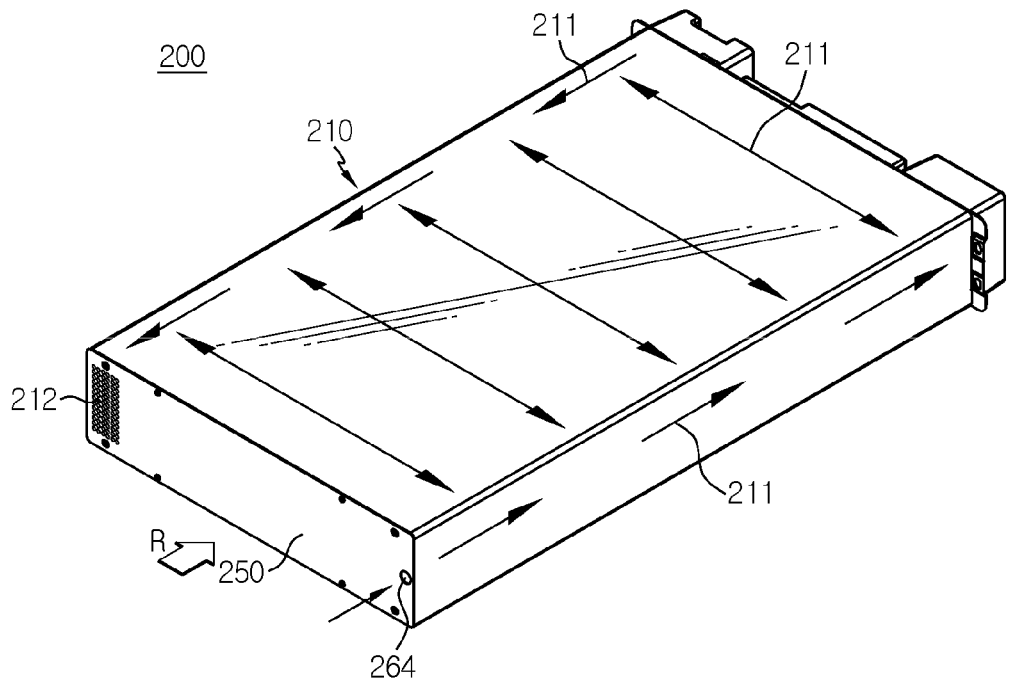
FIG. 7 is a rear perspective view schematically showing the battery module, employed at the battery pack according to an embodiment of the present disclosure.

FIG. 7 is a rear perspective view schematically showing the battery module, employed at the battery pack according to an embodiment of the present disclosure.

Referring to FIGS. 5 and 7 along with FIG. 1, the module housing 210 may have a gas passage 211 therein so that the gas generated from the cell assembly 100 flows therethrough. Here, the gas passage 211 may be a space elongated in the front and rear direction to communicate with the outside. The gas passage 211 may be provided at one of the left and right sides or both left and right sides of the cell assembly 100. For example, when viewed in the R direction, the gas passage 211 may have an empty space such that the gas generated in the cell assembly 100 may move to the right and left, and then move in the front and rear direction.

More specifically, the gas passage 211 may be a space between the upper or lower portion of the cell assembly 100 and the module housing 210. That is, the gas generated from the cell assembly 100 accommodated in the battery module 200 may move to both left and right sides of the cell assembly 100 through the gas passage 211 located at the upper or lower portion of the cell assembly 100 and be discharged out through a plurality of gas discharge holes 212 formed at the end of the gas passage 211 and perforated to communicate with the outside of the battery module 200.

An inlet hole 264 may be provided at the rear cover 250 located at the rear side of each of the at least two battery modules 200 so that the fire extinguishing agent is introduced therethrough. The inlet hole 264 may be positioned to communicate with the gas passage 211. That is, the inlet hole 264 may be configured to communicate with the gas passages 211 located on both left and right sides based on the cell assembly 100.

For example, when viewed in the R direction, the inlet hole 264 may be provided at the right side of the rear cover 250. In addition, the fire extinguishing agent introduced through the inlet hole 264 may move along the gas passage 211 located at the left side of the cell assembly 100, and subsequently, the fire extinguishing agent may move to the gas passage 211 located at the right side of the cell assembly 100 through the gas passage 211 located at the upper or lower portion of the cell assembly 100. Through this process, it is possible to extinguish and cool the ignited or overheated cell assembly 100 inside the battery module 200.

Figure 8:
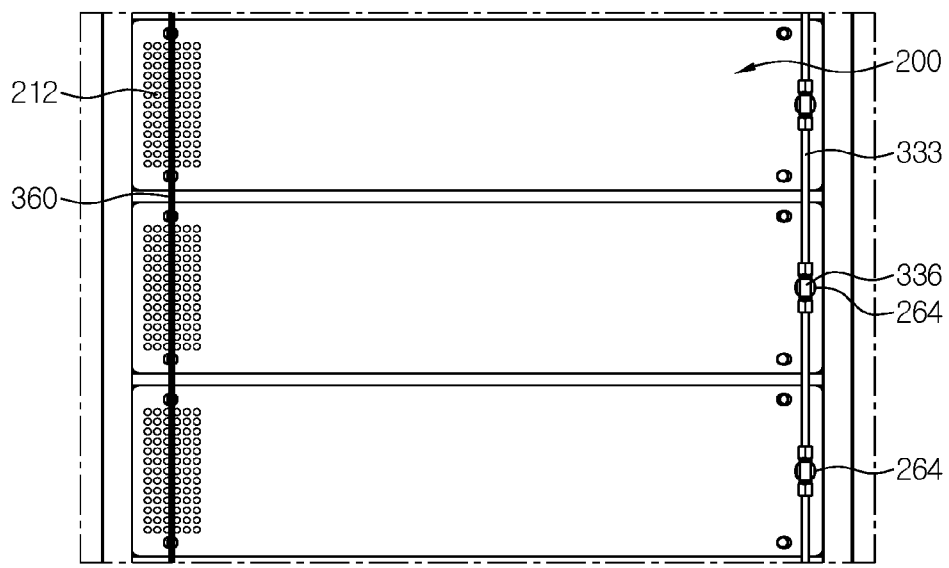
FIG. 8 is a partial rear view schematically showing a portion of the battery pack according to an embodiment of the present disclosure.
Figure 9:
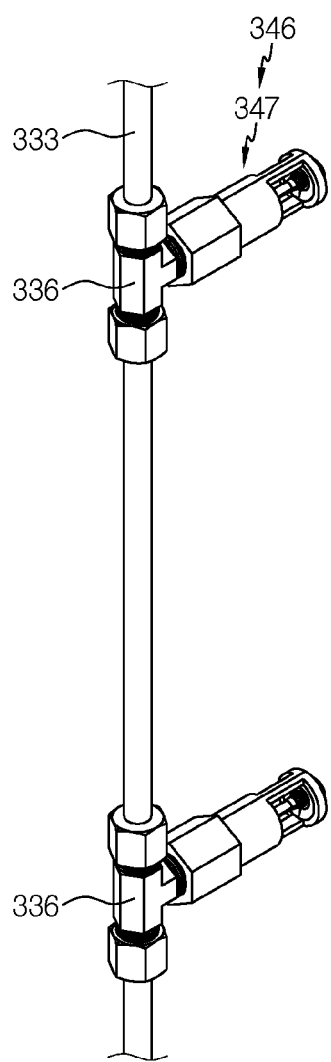
FIG. 9 is a partial perspective view schematically showing a pipe and a valve, employed at the battery pack according to an embodiment of the present disclosure.

FIG. 8 is a partial rear view schematically showing a portion of the battery pack according to an embodiment of the present disclosure. FIG. 9 is a partial perspective view schematically showing a pipe and a valve, employed at the battery pack according to an embodiment of the present disclosure. Also, FIG. 10 is a sectional view schematically showing some components of the battery pack according to an embodiment of the present disclosure.

Figure 10:
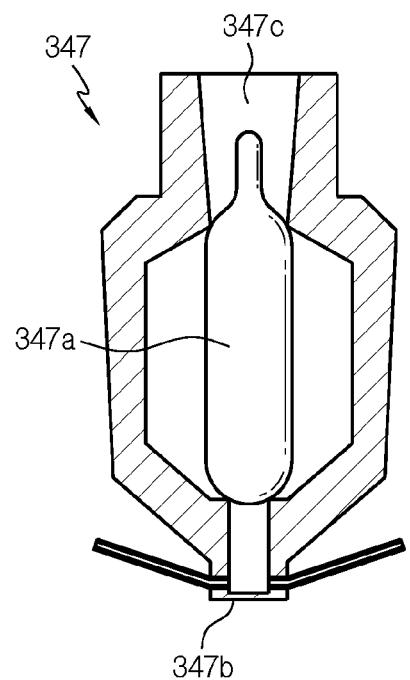
FIG. 10 is a sectional view schematically showing some components of the battery pack according to an embodiment of the present disclosure.

Referring to FIG. 10 along with FIGS. 3, 8 and 9, a valve 346 configured to be opened when the internal temperature of the battery module 200 increases over the predetermined temperature may be provided at a distal end of the distribution pipe 336 diverging from the common pipe 333 in a direction along which the fire extinguishing agent moves. At this time, the valve 346 may include an active valve or a passive valve 347. In this case, the distribution pipe 336 may be a Tee pipe or an elbow pipe.

For example, if the valve 346 includes the passive valve 347, the passive valve 347 may be configured to be opened when the battery module 200 is heated over the predetermined temperature so that the fire extinguishing agent may be injected into the battery module 200. The passive valve 347 may be configured such that at least a part of the passive valve 347 is inserted into the battery module 200 through the inlet hole 264 so that the passive valve 347 is opened by the internal temperature of the battery module 200.

For example, the passive valve 347 may be configured to be opened when the internal temperature of the battery module 200 is over the predetermined temperature. For example, the passive valve 347 may include a glass bulb 347a and a predetermined fluid (not shown) accommodated in the glass bulb 347a. The glass bulb 347a may be configured to seal a passage 347c (an inlet) of the passive valve 347 through which the fluid flows.

In addition, the glass bulb 347a may be configured to be broken by volume expansion of the predetermined liquid over the predetermined temperature, for example 70° C. to 100° C. That is, if the passive valve 347 is located inside the battery module 200, when the internal temperature of the battery module 200 rises over the predetermined temperature, the glass bulb 347a blocking the passage 347c of the valve 347 through which the fluid flows may be broken open the passage 347c of the valve. Further, the passive valve 347 may further include a dispersion unit 347b to disperse the discharged fluid in all directions.

Therefore, according to this configuration of the present disclosure, since at least a part of the passive valve 347 is inserted into the inlet hole 264 perforated to communicate with the gas discharge passage 211 provided to the battery module 200, when thermal runaway occurs, the passive valve 347 opens so that the fire extinguishing agent may be injected individually only to the million battery module at which the thermal runaway occurs. Moreover, since the fire extinguishing agent may be injected directly into the battery module 200, rather than to an outside thereof, it is possible to effectively extinguish and cool the fire of the battery module 200 at which thermal runaway occurs.

Figure 11:
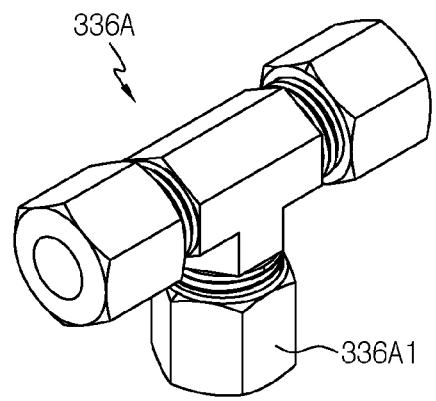
FIG. 11 is a perspective view schematically showing a distribution pipe, employed at a battery pack according to another embodiment of the present disclosure.

FIG. 11 is a perspective view schematically showing a distribution pipe, employed at a battery pack according to another embodiment of the present disclosure.

Referring to FIG. 11 along with FIG. 2, a battery pack 400 according to another embodiment of the present disclosure may be configured so that the flow rate of the fire extinguishing agent introduced into the distribution pipe 336A is different. For example, the at least two distribution pipes 336A may have different pipe diameters. Among the at least two distribution pipes 336A, a distribution pipe 336A diverging at a location relatively closer to the fire extinguishing tank 320 may have a smaller pipe diameter, compared to the remaining distribution pipes 336A.

For example, the distribution pipe 336A having a smallest distance from the fire extinguishing tank 320 to the pipe diverging from the common pipe 333 may be set to have a smallest pipe diameter. That is, in this configuration, the feed pressure of the fire extinguishing agent is higher as the distribution pipe 336A has a smaller distance from the fire extinguishing tank 320 to the pipe diverging from the common pipe 333. Thus, the feed amount of the distant distribution pipe 336A having a greater diverging distance may be greater than that of another distant distribution pipe 336A, so it is possible to prevent the flow rates supplied to the plurality of distribution pipes from deviating.

For example, as shown in FIG. 2, the distribution pipe 336A having a smallest pipe distance (path) diverging from the fire extinguishing tank 320 along the common pipe 333, namely the distribution pipe 336A disposed at a highest location, may have a greatest pipe diameter, and the distribution pipe 336A located in a path further away from the fire extinguishing tank 320 may have a greater pipe diameter in sequence.

For example, the Tee pipe 336A shown in FIG. 11 may be a distribution pipe 336A having a smallest pipe distance (path) diverging from the fire extinguishing tank 320 along the common pipe 333. That is, the distribution pipe 336A having a greater diverging distance may be configured to have a smaller pipe diameter 336A1 at the outlet side of the Tee pipe shown in FIG. 11, compared to other distribution pipes having greater pipe distances.

Therefore, according to this configuration of the present disclosure, since the at least two distribution pipes 336A are configured to have different pipe diameters, the feed flow rate of the fire extinguishing agent supplied through the distribution pipe may less deviate. Thus, it is possible to solve the conventional problem that the fire extinguishing capability deviates among the battery modules 200 according to the pipe distance of the fire extinguishing device in the battery pack 400. Therefore, it is possible to secure stable fire extinguishing capability of the battery pack 400.

Figure 12:
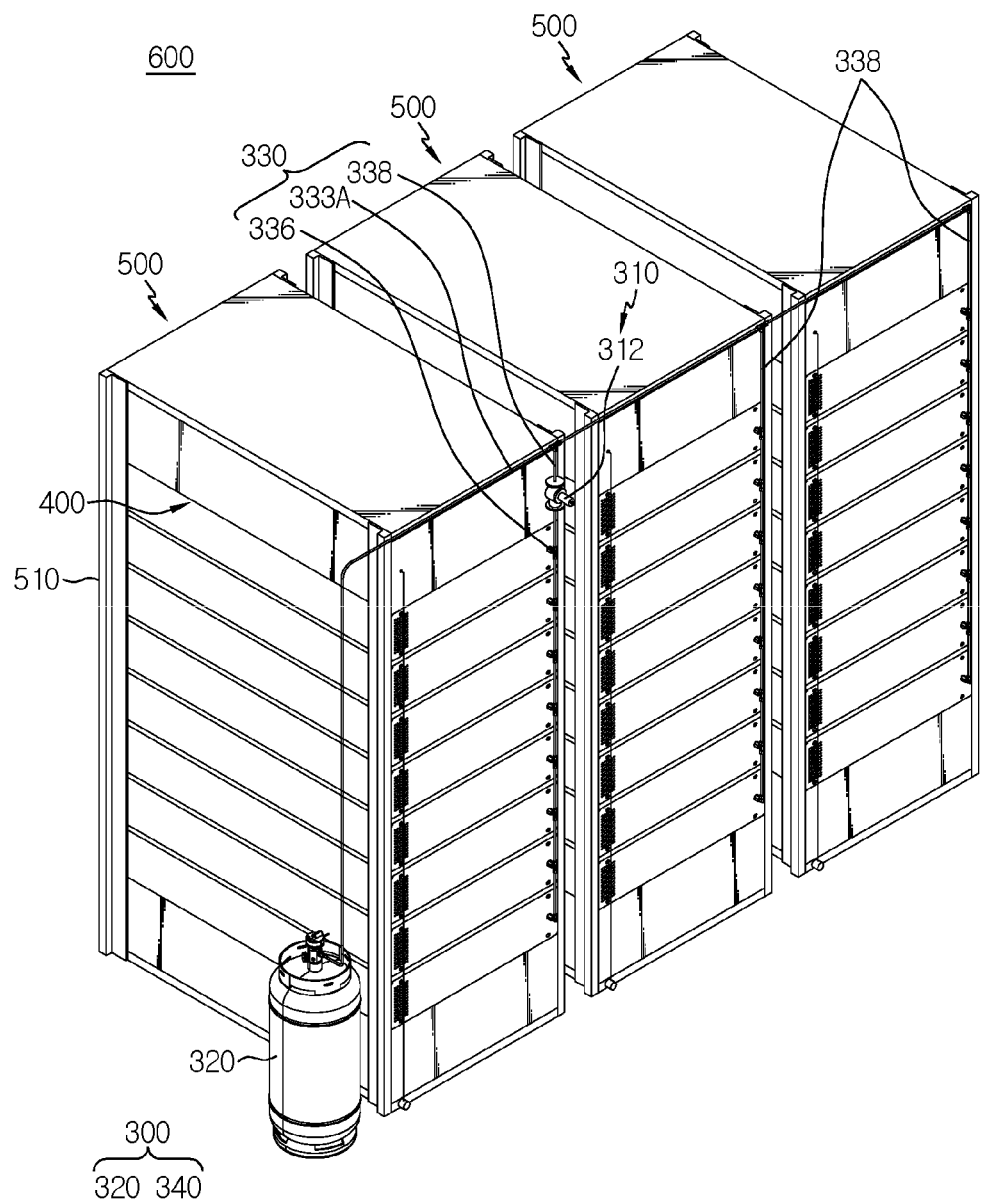
FIG. 12 is a rear view schematically showing an energy storage system according to another embodiment of the present disclosure.

FIG. 12 is a rear view schematically showing an energy storage system according to another embodiment of the present disclosure.

Referring to FIG. 12, a battery rack 500 according to an embodiment of the present disclosure may include the battery pack 400 and a rack case 510 for accommodating the battery pack 400. The rack case 510 may also be configured to accommodate a plurality of battery modules 200 of the battery pack 400 to be vertically stacked. Inside the rack case 510, the battery module 200 may be mounted such that its lower surface is in a parallel shape to the horizontal surface.

Here, the horizontal direction may refer to a direction parallel to the ground when the battery module 200 is placed on the ground, and may also refer to at least one direction on a plane perpendicular to the vertical direction.

Moreover, the rack case 510 is configured to have at least one side openable, and the battery module 200 may be inserted into the inner space through the open side. However, the rack case 510 may also be configured to allow such an open side to be closed.

In addition, the battery rack 500 may further include other components such as a battery management system 530 (BMS) or the like in or out of the rack case 510.

Meanwhile, an energy storage system 600 according to an embodiment of the present disclosure may include two or more battery racks 500. The two or more battery racks 500 may be arranged in one direction. For example, as shown in FIG. 16, the energy storage system 600 may be configured such that three battery racks 500 are arranged in one direction. In addition, the energy storage system 600 may have a central controller (not shown) capable of controlling charging and discharging of three battery racks 500.

The pipe 330 provided to the energy storage system 600 may include a common pipe 333A connected to an outlet hole of the fire extinguishing tank 320 through which the fire extinguishing agent is discharged, and at least two parallel pipes 338 diverging from the common pipe 333A to two or more battery racks 500. For example, as shown in FIG. 12, in the energy storage system 600, the pipe 330 connected to the fire extinguishing tank 320 may be configured to supply the fire extinguishing agent to each of the plurality of battery modules 200 provided in three battery racks 500 through the common pipe 333A, the parallel pipe 338 and the distribution pipe 336.

The flow rate adjusting part 310 may be provided to at least a part of the at least two parallel pipes 338. That is, among the at least two parallel pipes 338, the flow rate adjusting part 310 may be provided to the parallel pipe 338 having a relatively smaller pipe distance (path) to the fire extinguishing tank 320, and the flow rate adjusting part 310 may not be provided in the remaining parallel pipes 338. For example, as shown in FIG. 12, three parallel pipes 338 may be provided to diverge from the common pipe 333A. Among the three parallel pipes 338, the flow rate adjusting part 310 may be provided to the nearest first parallel pipe 338. In this case, the flow rate adjusting part 310 may include the decompression valve 312.

Therefore, according to this configuration of the present disclosure, since the energy storage system 600 of the present disclosure includes at least two parallel pipes 338 diverging from the common pipe 333A to each of two or more battery racks 500 and the flow rate adjusting part 310 is provided to at least a part of the at least two parallel pipes 338, it is possible to reduce the occurrence of deviation in the supply amount of the fire extinguishing agent supplied to each of the plurality of battery racks 500. Accordingly, the stability of the energy storage system 600 may be effectively increased.

In addition, the at least two parallel pipes 338 may be set to have different pipe diameters. For example, among the at least two parallel pipes 338, a parallel pipe 338 having a relatively smaller pipe distance (path) to the fire extinguishing tank 320 may be set to have a smaller pipe diameter.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
| --- | --- |
| 200: battery module | 100: cell assembly |
| 110: secondary battery | 210: module housing |
| 211: gas passage | 212: gas discharge hole |
| 264: inlet hole | 310: flow rate adjusting part |
| 300: fire extinguishing unit | |
| 320: fire extinguishing tank | 321: outlet hole |
| 330, 333, 336, 338: pipe, common pipe, distribution pipe, parallel pipe | |
| 340, 346: valve | |
| 344, 347: decompression valve, passive valve | |
| 350: controller | |
| 400: battery pack | 500: battery rack |
| 510: rack case | |
| 600: energy storage system | |

INDUSTRIAL APPLICABILITY

The present disclosure relates to a battery pack. In addition, the present disclosure is available for industries associated with a large-scale energy storage system including a battery pack.

What is claimed is:

1. A battery pack, comprising:
at least two battery modules arranged in one direction; and
a fire extinguisher comprising:
a fire extinguishing tank configured to contain a fire extinguishing agent;
a pipe connected to the fire extinguishing tank to supply the fire extinguishing agent from the fire extinguishing tank to each of the at least two battery modules;
a passive flow rate adjuster provided to the pipe and configured to adjust a feed flow rate of the fire extinguishing agent to be constant, and
at least one valve configured to supply the fire extinguishing agent from the fire extinguishing tank to a battery module of the at least two battery modules having an internal temperature rising over a predetermined temperature.

2. The battery pack according to claim 1, wherein the pipe includes a common pipe connected to an outlet hole of the fire extinguishing tank through which the fire extinguishing agent is output, and at least two distribution pipes diverging from the common pipe, and wherein the passive flow rate adjuster is provided at the common pipe.

3. The battery pack according to claim 2, wherein the passive flow rate adjuster includes at least one decompression valve configured to reduce a feed pressure of the fire extinguishing agent to a predetermined pressure or below.

4. The battery pack according to claim 2, wherein a passive valve is provided at a distal end of the distribution pipe in a direction along which the fire extinguishing agent moves, so that the passive valve is opened to inject the fire extinguishing agent into the battery module when the battery module is heated over the predetermined temperature.

5. The battery pack according to claim 4, wherein each of the at least two battery modules has a gas passage through which gas generated in the battery module moves, and an inlet hole connected to the gas passage so that the inside of the battery module communicates with the outside, and
wherein at least a part of the passive valve is inserted into the battery module through the inlet hole.

6. The battery pack according to claim 2, wherein the at least two distribution pipes are configured to have different pipe diameters.

7. The battery pack according to claim 6, wherein among the at least two distribution pipes, a distribution pipe diverging at a location relatively closer to the outlet hole has a smaller pipe diameter compared to the remaining distribution pipe.

8. The battery pack according to claim 1, wherein the passive flow rate adjuster comprises:
a valve body;
an inlet in the valve body;
a spring and disc inside the valve body; and
an outlet in the valve body.

9. The battery pack according to claim 8, wherein the spring and disc are aligned with an axis of the inlet.

10. The battery pack according to claim 8, wherein the passive flow rate adjuster is configured to reduce the feed pressure of the fire extinguishing agent to a predetermined pressure or below.

11. The battery pack according to claim 1, wherein the passive flow rate adjuster has an inlet and an outlet connected to the pipe, and
wherein the passive flow rate adjuster reduces a feed pressure of the fire extinguishing agent supplied at the inlet to a predetermined pressure or below.

12. A battery rack, comprising:
a battery pack according to claim 1; and
a rack case configured to accommodate the battery pack.

13. An energy storage system, comprising two or more battery racks according to claim 12.

14. The energy storage system according to claim 13, wherein the pipe provided to the fire extinguisher of the battery rack includes a common pipe connected to an outlet hole of the fire extinguishing tank through which the fire extinguishing agent is output, and at least two parallel pipes diverging from the common pipe to each of the two or more battery racks, and
wherein the passive flow rate adjuster is provided to at least a part of the at least two parallel pipes.

* * * * *